United States Patent
Schier et al.

(10) Patent No.: US 12,269,504 B2
(45) Date of Patent: Apr. 8, 2025

(54) PARTICLE FILTER TO DETECT STATIC AND DYNAMIC OBSTACLES

(71) Applicant: Mercedes-Benz Group AG, Stuttgart (DE)

(72) Inventors: Manuel Schier, Santa Clara, CA (US); Gunther Krehl, San Francisco, CA (US); Jakob Siegel, Brisbane, CA (US)

(73) Assignee: Mercedes-Benz Group AG, Stuttgart (DE)

( * ) Notice: Subject to any disclaimer, the term of this patent is extended or adjusted under 35 U.S.C. 154(b) by 212 days.

(21) Appl. No.: 18/069,686

(22) Filed: Dec. 21, 2022

(65) Prior Publication Data
US 2024/0208531 A1    Jun. 27, 2024

(51) Int. Cl.
*B60W 60/00*    (2020.01)

(52) U.S. Cl.
CPC ....... *B60W 60/001* (2020.02); *B60W 2554/20* (2020.02); *B60W 2554/4049* (2020.02)

(58) Field of Classification Search
CPC .......... B60W 60/001; B60W 2554/20; B60W 2554/4049; B60W 2554/00; B60K 28/00; B60K 2028/003; B60K 2028/006; B60K 28/02; B60K 28/04; B60K 28/06; B60K 28/063; B60K 28/066; B60K 28/08; B60K 28/10; B60K 28/12; B60K 28/14; B60K 28/16; B60K 28/165; G05D 1/0061;
(Continued)

(56) References Cited

U.S. PATENT DOCUMENTS

| 10,089,419 B2 | 10/2018 | Michalke et al. |
| 11,282,158 B2 | 3/2022 | Vatavu et al. |

(Continued)

FOREIGN PATENT DOCUMENTS

| CN | 109186625 B | 5/2020 |
| CN | 113051529 A | 6/2021 |

(Continued)

OTHER PUBLICATIONS

Dempster "A Generalization of Bayesian Inference," Journal of the Royal Statistical Society, Series B (Methodological), vol. 30, No. 2, Feb. 14, 1968, 27 pages.

Nuss, et al "A Random Finite Set Approach for Dynamic Occupancy Grid Maps With Real-Time Application," https://arxiv.org/abs/1605.02406, Computer Science > Robotics, Sep. 10, 2016, 20 pages.

(Continued)

*Primary Examiner* — Yufeng Zhang
(74) *Attorney, Agent, or Firm* — ANOVA LAW GROUP, PLLC

(57) ABSTRACT

Briefly, example methods, apparatuses, and/or articles of manufacture may be implemented to access, from at least one memory device, sensor measurements generated by one or more sensors mounted in a vehicle and to generate an occupancy grid having grid cells that track occupancy, by static obstacles and dynamic obstacles, in an environment of the vehicle based on the accessed sensor measurements. An apparatus may additionally allocate (i) a first set of particles to estimate occupancy of grid cells by the static obstacles and states of the static obstacles and (ii) a second set of particles to estimate occupancy of grid cells by the dynamic obstacles and states of the dynamic obstacles. An apparatus may additionally execute one or more operations to plan motion of the vehicle based on the estimated occupancy of grid cells by the static obstacles and dynamic obstacles.

14 Claims, 8 Drawing Sheets

(58) Field of Classification Search
CPC .... G05D 1/0088; G05D 1/021; G05D 1/0214; G05D 1/0221; G05D 1/0223
See application file for complete search history.

(56) References Cited

U.S. PATENT DOCUMENTS

2021/0354690 A1* 11/2021 Yershov ............... G05D 1/0274
2022/0083077 A1    3/2022 Pereira Da Silva et al.

FOREIGN PATENT DOCUMENTS

| CN | 114674320 A | 6/2022 |
| GB | 2599255 A | 3/2022 |
| GB | 2600196 A | 4/2022 |
| GB | 2606139 A | 11/2022 |

OTHER PUBLICATIONS

Danescu, et al "Modeling and Tracking the Driving Environment with a Particle Based Occupancy Grid," IEEE Transactions on Intelligent Transportation Systems, vol. 12, No. 4, Dec. 2011, 12 pages.

Nègre, et al "Hybrid Sampling Bayesian Occupancy Filter," in Proceedings of the IEEE Intelligent Vehicles Symposium, Jun. 24, 2014, 6 pages.

Tanzmeister et al "Grid-based Mapping and Tracking in Dynamic Environments Using a Uniform Evidential Environment Representation," 2014 IEEE International Conference on Robotics & Automation (ICRA), Hong Kong Convention and Exhibition Center, May 31-Jun. 7, 2014, 6 pages.

* cited by examiner

PARTICLE FILTER TO DETECT STATIC AND DYNAMIC OBSTACLES

BACKGROUND

1. Field

The present disclosure relates generally to estimation and/or detection of the presence of static and dynamic objects, as such devices may be utilized in autonomous vehicle driving applications.

2. Information

In an autonomous vehicle driving application, a sensor suite may operate to detect obstacles in a localized environment so as to facilitate safe operation of the vehicle in a variety of traffic environments. In such applications, a sensor suite, which may include lidar sensors, radar sensors, imaging devices, or other sensor types, may occasionally or periodically measure and/or observe various aspects of the vehicle environment to generate a real-time or near-real-time awareness of moving or stationary obstacles that may impede travel of the vehicle. In some instances, combining sensor measurements and/or observations of a vehicle environment may represent a computationally-intensive task, especially in traffic environments laden with numerous stationary and moving vehicles, pedestrians, natural obstacles, structures, signposts, and so forth. Such computationally-intensive tasks may become additionally problematic as the velocity of the vehicle increases.

In some autonomous vehicle driving applications, an optimization filter may be employed, which may operate to reduce errors introduced by the various sensors of the sensor suite. However, in typical autonomous vehicle driving applications, such optimization filters may further increase demands on processing resources, thereby further exacerbating an already computationally-intensive task. Further, in some instances, detection of moving obstacles versus stationary obstacles may be performed via separate optimization filters. Such separation in the detection of moving versus stationary obstacles may create internal, and unresolvable, conflicts within the processing resources allocated to an autonomous vehicle driving application. Accordingly, it may be appreciated that advancing optimization filtering approaches for autonomous vehicle driving applications continues to be an active area of investigation.

SUMMARY

One general aspect includes an apparatus, including a processor coupled to at least one memory device, the processor configured to access, from the at least one memory device, sensor measurements generated by one or more sensors mounted in a vehicle. The processor coupled to the at least one memory device may additionally generate an occupancy grid having grid cells that track occupancy, by static obstacles and dynamic obstacles, in an environment of the vehicle based on the accessed sensor measurements. The processor coupled to the at least one memory device may additionally allocate (i) a first set of particles to estimate occupancy of grid cells by the static obstacles and states of the static obstacles and (ii) a second set of particles to estimate occupancy of grid cells by the dynamic obstacles and states of the dynamic obstacles. The processor coupled to the at least one memory device may additionally execute one or more operations to plan motion of the vehicle based on the estimated occupancy of grid cells by the static obstacles and the dynamic obstacles.

In particular embodiments, the processor is further configured to adjust the allocation of the first set of particles and the second set of particles based on the accessed sensor measurements to modify operation of a particle filter. In particular embodiments, the processor is further configured to adjust a movable division that is to separate the first set of particles from the second set of particles based on a ratio of a quantity of the first set of particles to a total quantity of particles, or a ratio of a quantity of the second set of particles, to the total quantity of particles. In particular embodiments, the processor is further configured to allocate a third set of particles as newly spawned particles based on the accessed sensor measurements. In particular embodiments, the processor is further configured to reduce a magnitude of one or more velocity vectors of the first set of particles in relation to a magnitude of one or more velocity vectors of the second set of particles. In particular embodiments, the processor is further configured to predict a future position of at least one of the static obstacles relative to a static reference frame. In particular embodiments, the processor is further configured to resample one or more of the second set of allocated particles to update the estimated states of the dynamic obstacles. In particular embodiments, the processor is further configured to classify a cell of the occupancy grid as a dynamic cell based on the second set of allocated particles. In particular embodiments, the processor is further configured to classify the cell of the occupancy grid as the dynamic cell further based on a confidence factor exceeding a threshold value.

Another general aspect includes a method of processing measurements to estimate states of one or more objects, the method being performed by one or more processors and including accessing, from a memory device, sensor measurements generated by one or more sensors mounted in a vehicle. The method of processing measurements also includes generating an occupancy grid having grid cells that track occupancy, by static obstacles and dynamic obstacles, in an environment of the vehicle based on the accessed sensor measurements. The method of processing measurements also includes allocating (i) a first set of particles to estimate occupancy of grid cells by the static obstacles and states of the static obstacles and (ii) a second set of particles to estimate occupancy of grid cells by the dynamic obstacles and states of the dynamic obstacles. The method of processing measurements also includes performing motion planning of the vehicle based on the estimated occupancy of grid cells by the static obstacles and the dynamic obstacles.

In particular embodiments, a method additionally includes adjusting the allocation of the first set of particles and the second set of particles based on the accessed sensor measurements to modify operation of a particle filter. In particular embodiments, a method additionally includes adjusting a movable division that is to separate the first set of particles from the second set of particles based on a ratio of a quantity of the first set of particles to a total quantity of particles, or a ratio of a quantity of the second set of particles, to the total quantity of particles. In particular embodiments, a method additionally includes allocating a third set of particles as newly spawned particles based on the accessed sensor measurements. In particular embodiments, a method additionally includes reducing a magnitude of one or more velocity vectors of the first set of particles in relation to a magnitude of one or more velocity vectors of the second set of particles. In particular embodiments, a method additionally includes predicting a future position of at least one of the static obstacles relative to a static reference frame. In particular embodiments, a method additionally includes resampling one or more of the second set of allocated particles to update the estimated states of the dynamic obstacles. In particular embodiments, a method additionally includes classifying a cell of the occupancy grid as a dynamic cell based on the resampled one or more of the second set of allocated particles. In particular embodiments, a method additionally includes determining a confidence factor that the dynamic cell exceeds a threshold prior to classifying the cell of the occupancy grid as the dynamic cell.

Another general aspect includes an article, which includes a non-transitory storage media having instructions encoded thereon, which, when executed by a computer processor coupled to at least one memory device, cause the computer processor to access, from the memory device, sensor measurements generated by one or more sensors mounted in a vehicle. The encoded instructions may additionally be to generate an occupancy grid having grid cells that track occupancy, by static obstacles and dynamic obstacles, in an environment of the vehicle based on the accessed sensor measurements. The encoded instructions may additionally be to allocate (i) a first set of particles to estimate occupancy of grid cells by the static obstacles and states of the static obstacles and (ii) a second set of particles to estimate occupancy of grid cells by the dynamic obstacles and states of the dynamic obstacles. The encoded instructions may additionally be to execute one or more operations to plan motion of the vehicle based on the estimated occupancy of grid cells by the static obstacles and dynamic obstacles.

In particular embodiments, the encoded instructions are further to cause the computer processor to adjust the allocation of the first set of particles and the second set of particles based on the accessed sensor measurements to modify operation of a particle filter. In particular embodiments, the encoded instructions are further to cause the computer processor to adjust a movable division that is to separate the first set of particles from the second set of particles based on a ratio of a quantity of the first set of particles to a total quantity of particles, or a ratio of a quantity of the second set of particles, to the total quantity of particles. In particular embodiments, the encoded instructions are further to cause the computer processor to resample one or more of the second set of allocated particles to update the estimated states of the dynamic obstacles. In particular embodiments, the encoded instructions are further to classify a cell of the occupancy grid as a dynamic cell based on the resampled one or more of the second set of allocated particles.

BRIEF DESCRIPTION OF THE DRAWINGS

Claimed subject matter is particularly pointed out and distinctly claimed in the concluding portion of the specification. However, organization and/or method of operation, features, and/or advantages thereof, may best be understood by reference to the following detailed description if read with the accompanying drawings in which:

Figure 1:
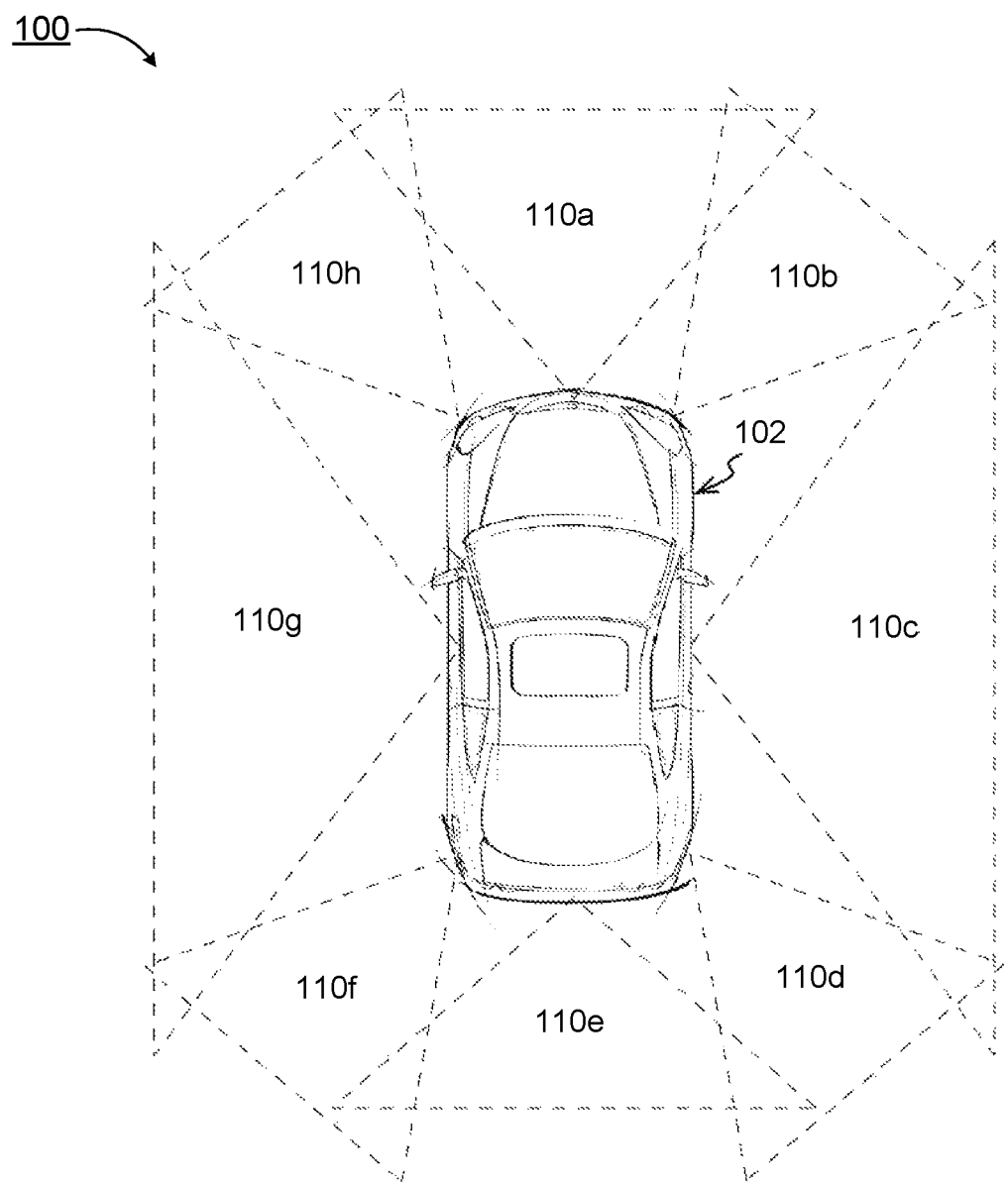
FIG. 1 depicts a localized vehicle environment for sensor observation and/or measurement in an autonomous vehicle driving application, according to an embodiment.

Reference is made in the following detailed description to the accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. In addition, one or more aspects, properties, etc., may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

Throughout this specification, references to an embodiment, one embodiment, and/or the like, means that a particular feature, structure, characteristic, and/or the like described in relation to a particular embodiment is included in at least one and/or embodiment of claimed subject matter. Thus, appearances of such phrases are not necessarily intended to refer to the same embodiment or to any one particular embodiment. Furthermore, it is to be understood that particular features, structures, characteristics, or the like described, are capable of being combined in various ways in one or more embodiments and, therefore, are within intended claim scope. In general, for the specification of a patent application, these and other issues have a potential to vary in a particular circumstance of usage. In other words, throughout the disclosure, particular circumstances of description and/or usage provides guidance regarding reasonable inferences to be drawn. The phrase "as the term is used herein" in general without further qualification refers at least to the context of the present patent application.

As previously alluded to, in an autonomous vehicle driving application, a sensor suite may operate to detect obstacles in a localized environment so as to facilitate safe operation of the vehicle in a variety of traffic situations. In the context of the present application, the term "traffic environment" refers to an area or volume of space that at least partially surrounds or envelops a vehicle. Such vehicles may include automobiles, delivery or cargo vehicles, airborne vehicles, waterborne vehicles or any other type of vehicle that may, at least from time to time, undergo autonomous or semi-autonomous motion. In this context, a traffic environment may include a volume of space in a forward direction relative to a vehicle, a reverse direction relative to a vehicle, areas or volumes of space to the left or to the right of a vehicle, as well as areas in upward and downward directions relative to the vehicle. In these applications, and potentially others, an ensemble of sensors, which may include lidar sensors, radar sensors, infrared sensors, inertial navigation sensors, magnetometers (or other direction-sensing devices), imaging devices, or other sensor types, may occasionally or periodically sample various aspects of a vehicle environment to facilitate generation of a real-time or near-real-time awareness of moving or stationary obstacles that may encroach on a path of travel of the vehicle. In an autonomous vehicle driving application, an autonomous vehicle driving controller, or other processing entity, may execute one or more operations to plan motion of the vehicle based on the estimated occupancy of grid cells by static obstacles and dynamic obstacles. Based on executing operations to plan motion of the vehicle, an autonomous vehicle driving controller may exert control or influence over vehicle driving functions, such as steering the vehicle in a leftward or rightward direction, accelerating the vehicle, applying braking, or initiating any other control-related function.

In some instances, combining measurements and/or observations of a vehicle environment, such as from various sensors of a sensor suite located on or within a vehicle, may represent a computationally-intensive task. Computing demands may increase under particular driving conditions, especially in high-traffic environments in which numerous stationary and moving vehicles, pedestrians, natural obstacles, structures, signposts, may be present. Computing demands may further increase as the velocity of the vehicle increases, which may require computing devices to process a greater number of sensor measurements and/or observations with little time between successive sensor measurements and/or observations. It may be appreciated that in autonomous driving scenarios, a premium is placed on the safety of the driver, passengers, other motorists and pedestrians.

In some instances, an optimization filter may be employed in an autonomous vehicle driving application, which may operate to minimize errors introduced by the various sensor types. However, in some autonomous vehicle driving applications, such optimization filters may further increase demands on processing resources, thereby exacerbating an already computationally-intensive task. Further, in some instances, detection of moving (e.g., dynamic) obstacles versus stationary (e.g., static) obstacles may be performed via separate optimization filters. Such separation of the detection of dynamic versus static obstacles may create internal, and unresolvable, conflicts within the processing resources allocated to the autonomous vehicle driving application. For example, as discussed in greater detail in reference to FIG. 3, a first optimization filter may determine or estimate that a particular grouping, aggregation, or other type of set of sensor observations and/or measurements is indicative of a dynamic obstacle. Meanwhile, or following such determination or estimation, a second (and separate) optimization filter may determine or estimate that a particular set of sensor measurements is indicative of a stationary obstacle. Consequently, a conflict may arise within the autonomous vehicle driving application in which it is unknown, or at least ambiguous, whether a particular set of sensor observations and/or measurements accords with or indicates a static obstacle or a dynamic obstacle. Such conflicts may represent an unresolvable occurrence, which negatively impact the quality of input signals conveyed to, for example, an autonomous vehicle driving controller. It may be appreciated that, based on such occurrences, safety of an autonomous vehicle driving application may be compromised, thereby degrading a capability for safe autonomous vehicle driving.

It may also be appreciated that dedicating or allocating processing resources to separate optimization filters may entail an inefficient use of vehicle computer processing entities assigned to autonomous vehicle driving applications. In such a system architecture, separate processing pipelines may bring about a need to implement separate processing hardware entities, separate memory arrays within memory devices, separate allocations of configuration files, and so forth. As a consequence of such inefficient use of dedicated or allocated processing resources for autonomous vehicle driving applications, fewer processing resources may be available to conduct other vehicle operations, such as passenger entertainment, performance monitoring of vehicle systems and subsystems, battery resource management, etc.

However, in particular nonlimiting embodiments described herein, performance of autonomous vehicle driving applications may be enhanced via the use of an optimization filter capable of processing sensor measurements and/or observations consistent with static obstacles and dynamic obstacles. In this context, a "dynamic" obstacle refers to an obstacle in a localized vehicle environment that is presently undergoing displacement from a first location to a second location. In such contexts, a dynamic obstacle corresponds to an obstacle that includes a nonzero (or non-negligible) velocity vector. Thus, for example, a dynamic obstacle may refer to a moving automobile in a traffic situation, a moving motorcycle, a walking or running pedestrian, a moving bicyclist, a running animal, or any other obstacle having a nonzero (or non-negligible) motion vector. Also in this context, a stationary or "static" object refers to an obstacle in a localized vehicle environment that is presently stationary, such as an object that possesses a velocity vector of 0.0 or is otherwise undergoing negligible motion. Thus, for example, a static obstacle may include a parked automobile, a parked motorcycle, a signpost or traffic signal post, a stationary natural object (e.g., a tree, one or more rocks, a shrubbery, a barricade, a traffic abutment, a wall, a building, etc.).

Particular embodiments may include an optimization filter capable of detecting or estimating static and dynamic obstacles. One such optimization filter may correspond to a "particle filter," which refers to an optimization filter that operates to estimate a density of state variables in view of accumulated sensor measurements and/or observations. In such a filter, individual sensor measurements, which may be represented by a "particle" within the particle filter, is accorded a relatively small weight which, in view of past sensor measurements or observations, may be summed or aggregated to arrive at an "occupancy belief" that a particular measurement cell of a unified measurement grid includes a static (e.g., stationary) obstacle or a dynamic (e.g., moving) obstacle. In this context, a "unified measurement grid" refers to a single measurement grid representing a localized vehicle driving environment. Thus, for example, a unified measurement grid may include a number of "cells" which, also in this context, refers to a subdivision of a localized vehicle driving environment. In one possible embodiment, cells of a unified measurement grid may include volume subdivisions having linear dimensions of approximately 13 cm×13 cm×13 cm (e.g., approximately 2200 cubic centimeters). However, in other embodiments, a unified measurement grid may include volume subdivisions having virtually any other linear dimensions, such as linear dimensions of between 10 cm×10 cm×10 cm and 30 cm×30 cm×30 cm, and claimed subject matter is not limited in this respect.

In particular embodiments, a particle filter capable of detecting or estimating presence of static and dynamic obstacles may include one or more movable or adjustable boundaries that separate a first set of particles, which may include particles estimating a weighted state of one or more static obstacles, from a second set of particles, which may include particles estimating a weighted state of one or more dynamic obstacles. Based on whether a measurement grid indicates a proportionally larger quantity of static obstacles in relation to dynamic obstacles, the adjustable boundary of the particle filter may be moved in a first direction, so as to accommodate a greater number of estimated weighted states of static obstacles. Based on whether a measurement grid indicates a proportionally larger quantity of dynamic obstacles in relation to static obstacles, the adjustable boundary of the particle filter may be moved in a second direction (e.g., opposite the first direction), so as to accommodate a greater number of estimated weighted states of static obstacles. Accordingly, at least in particular embodiments, a single particle filter may be utilized to accommodate static and dynamic obstacles, thereby increasing processing efficiency of an optimization filter utilized in an autonomous vehicle driving application. Further, a single particle filter may avoid unresolvable conflicts in which a first particle filter indicates that a particular obstacle corresponds to a dynamic obstacle, while a second particle filter indicates that a particular obstacle corresponds to a static obstacle.

In particular embodiments, a particle filter may additionally include a region to accommodate newly spawned dynamic particles, as such dynamic particles are introduced in response to sensor measurements and/or observations that indicate presence of a newly-detected dynamic obstacle in the unified measurement grid. Further, based on whether a newly detected dynamic obstacle in the unified measurement grid corresponds to a region of the driving environment where there is high confidence or high belief that the dynamic particle is detected within an area estimated to correspond exclusively to a static obstacle, a newly spawned dynamic particle may be inhibited from estimating a weighted state of a dynamic object. Accordingly, such estimated weighted states corresponding to the dynamic object may be inhibited from forming within the particle filter. Hence, particles tracking or monitoring such dynamic objects may be removed from the particle filter, thus inhibiting the filter from tracking estimated weighted states unlikely to be present at particular locations within the unified measurement grid.

FIG. 1 depicts a localized vehicle environment for sensor observation and/or measurement in an autonomous vehicle driving application, according to an embodiment 100. As depicted in FIG. 1, an autonomously operatable vehicle, such as autonomously operatable vehicle 102, may include a number of sensors disposed on or within vehicle 102. Although a particular pattern and/or a particular number of sensors is depicted in the embodiment of FIG. 1, subject matter is not limited in scope in this respect. For example, a system or device, such as autonomously operatable vehicle 102, may include any number of sensors in any of a wide range of arrangements and/or configurations. In addition, although FIG. 1 is depicted as a two-dimensional representation, sensors of an autonomously operatable vehicle, for example, may generate signals and/or signal packets representative of measurements and/or observations of obstacles surrounding vehicle 102 in a three-dimensional space. In particular embodiments, one-dimensional, two-dimensional, or three-dimensional sensor measurements and/or observations may be combined and/or otherwise processed to produce a three-dimensional estimate of an environment that surrounds or envelops vehicle 102, for example.

In particular embodiments, various sensors may be mounted on or within vehicle 102, for example, so as to facilitate imaging and/or measuring of differing portions of the environment surrounding and/or adjacent to vehicle 102. The environment surrounding and/or adjacent to vehicle 102 may be subdivided into a unified measurement grid as previously described hereinabove. In the embodiment of FIG. 1, vehicle 102 includes multiple sensor functionalities, which provide a capability for detecting incoming signals, such as incoming signals corresponding to visible light, infrared energy, ultraviolet energy, RF energy, signals from a satellite positioning system (e.g., GPS), microwave and millimeter wave energy, coherent laser energy, etc. Sensors of vehicle 102 may additionally include acoustic sensors, which respond to variations in sound pressure, for example. Vehicle 102 may additionally include directional sensing devices (e.g., a compass or magnetometer) and may additionally include the capability for inertial navigation, which may operate to sense acceleration in multiple axes with respect to the orientation of vehicle 102. Individual sensors may utilize differing fields of observation into an environment surrounding or enveloping vehicle 102. Example fields-of-view 110$a$, 110$b$, 110$c$, 110$d$, 110$e$, 110$f$, 110$g$, and 110$h$ may be represented by a unified measurement grid, although claimed subject matter is intended to embrace any configuration of sensor fields-of-view of sensors of vehicle 102.

In particular embodiments, output signals and/or output signal packets transmitted from onboard sensors of vehicle 102 may be utilized by at least one processor (such as a processor executing an optimization filter coupled to an autonomous vehicle driving application) to estimate presence of static and dynamic obstacles within the identified fields-of-view. Such output signals representing sensor measurements and/or observations may be utilized by the one or more processors of vehicle 102 to autonomously guide the vehicle through a driving environment, for example.

Figure 2:
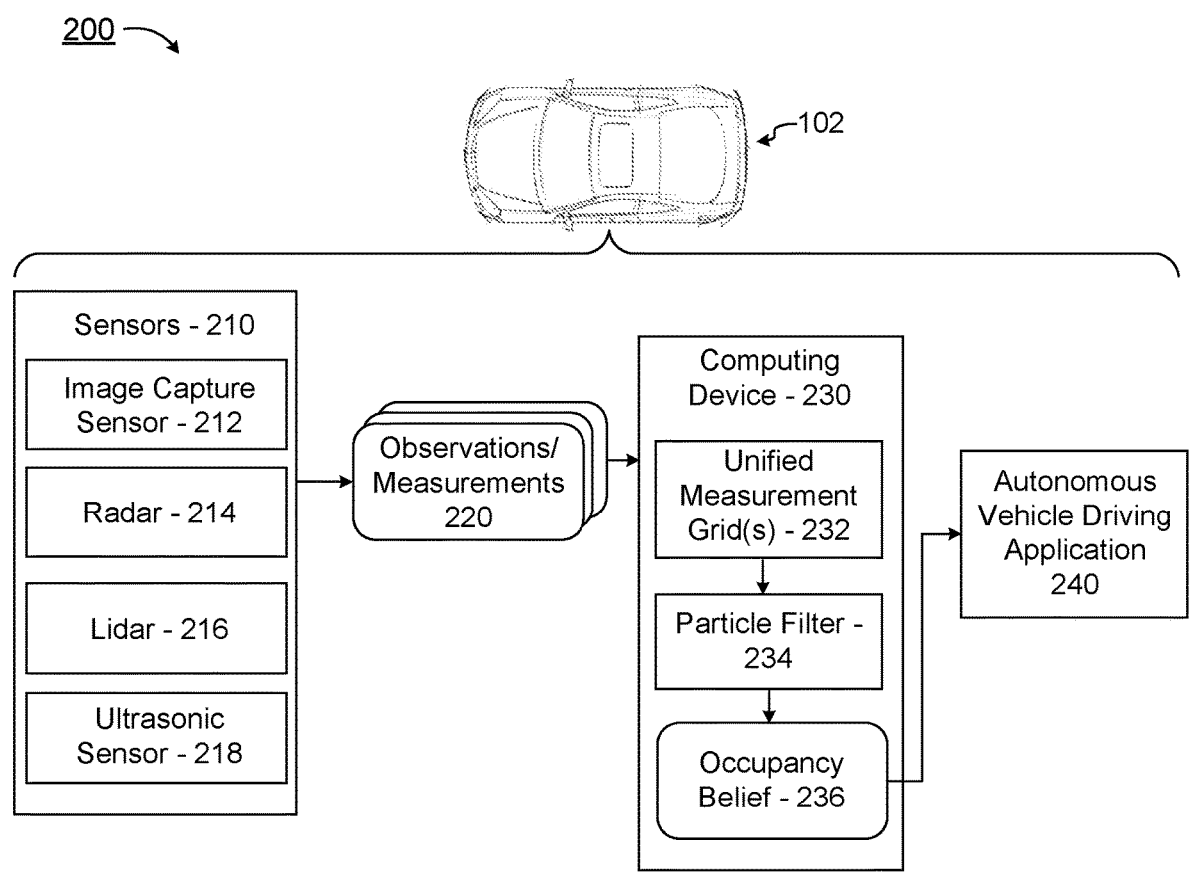
FIG. 2 depicts a schematic block diagram of an example system for sensor observation and/or measurement for detecting static and dynamic obstacles in an autonomous vehicle driving application, according to an embodiment.

FIG. 2 depicts a schematic block diagram of an example system for sensor observation and/or measurement for detecting static and dynamic obstacles in an autonomous vehicle driving application, according to an embodiment 200. As depicted in FIG. 2, vehicle 102 generates a number of signal sources representing measurements and/or observations from sensors 210. Accordingly, sensors 210, which may include numerous sensors and/or measurement devices. Output signals, for example, from sensors 210 may include observations and/or measurements 220, which operate to provide computing device 230 with input signals that represent the environment surrounding or enveloping vehicle 102. Observations and were sensor measurements 220 may be allocated by computing device 230 into one or more cells of unified measurement grid, in which the cells of the unified measurement grid represent a subdivided representation of the localized driving environment of vehicle 102. In particular embodiments, sensors 201 may include image capture sensor 212, radar 214, lidar 216, ultrasonic sensor 218, although claimed subject matter is intended to embrace numerous sensor types, virtually without limitation.

Computing device 230 may include processing modules to locate and/or correlate input signals representing sensor measurements and/or observations to a particular cell within one or more unified measurement grids 232. Particle filter 234 may operate to accumulate, over time, estimated weighted states of sensor observations and/or measurements disposed or positioned within one or more unified measurement grids 232. In particular embodiments, unified measurement grid(s) 232 may represent several unified measurement grids, representing estimated states of static obstacles and dynamic obstacles at various time points (e.g., timestamps) occurring in the past, as vehicle 102 moves along a path of travel. As vehicle 102 progresses along a path of travel, particle filter 234 may occasionally or periodically update particles representing states of static and dynamic obstacles estimated to be present in an environment of vehicle 102. Accordingly, as vehicle 102 moves along a path of travel, particle filter 234 operates to assign estimated weights to signal samples derived from unified measurement grid(s) 232. Over time, particle filter 234 accumulates or sums estimated weights corresponding to obstacles tracked via one or more unified measurement grid 232s. Based on a summation of estimated weight states, particle filter 234 generates a metric of occupancy belief, such as via occupancy belief 236, as to whether one or more cells of unified measurement grid can be classified as being occupied by a static obstacle or by a dynamic obstacle. In an example, classification of an obstacle within one or more cells may be based on an occupancy belief that approaches a predetermined, relatively high predetermined threshold value (e.g., 0.7, 0.8, 0.9, 0.95, etc.). Based on such classification, computing device 230 may execute one or more operations to plan motion of the vehicle based on the estimated occupancy of grid cells by the static obstacles and dynamic obstacles. As a result of such planning operations, autonomous driving application 240 may adjust vehicle steering so as to avoid a suspected static or dynamic obstacle. In an example, based on an occupancy belief that approaches a different, relatively low predetermined threshold value (e.g., 0.01, 0.05, 0.1, etc.), a cell of a unified measurement grid may be classified as containing free space. Consequently, autonomous driving application 240 may maintain the magnitude and direction of a velocity vector of vehicle 102.

Figure 3:
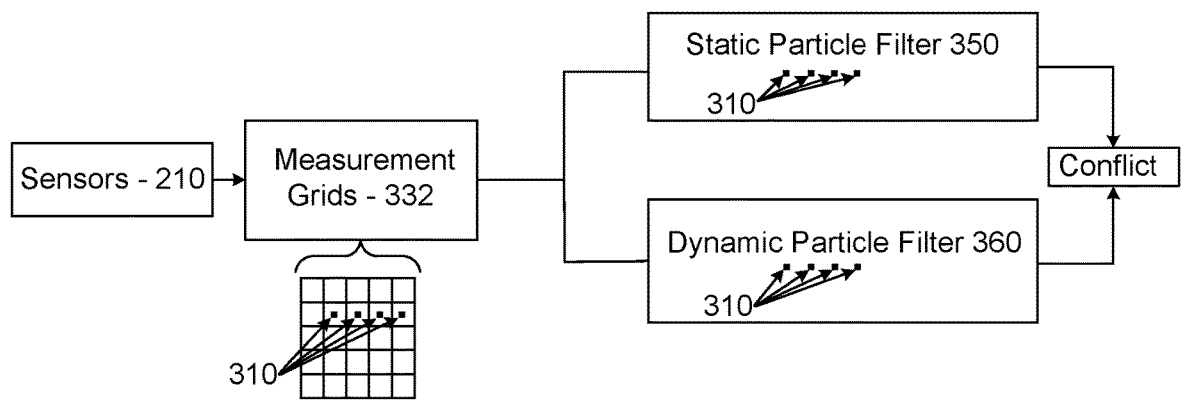
FIG. 3 depicts a schematic block diagram of sensors coupled to measurement grids, according to a typical, present-day, implementation.

FIG. 3 depicts a schematic block diagram of sensors coupled to measurement grids, according to a typical, present-day, implementation 300. As previously noted herein, in typical implementations, output signals representing signal observations and/or measurements may be positioned into separate static and dynamic measurement grids 332. Accordingly, static particle filter 350 may erroneously estimate signal samples 310 as relating to a static obstacle located within a measurement grid 332. Alternatively, or in addition to, dynamic particle filter 360 may erroneously estimate signal samples 310 as relating to a dynamic obstacle located within a separate measurement grid 332. Accordingly, such erroneous estimation of an estimated weighted state corresponding to obstacles located within separate measurement grids may bring about a conflict as to whether a cell of one of measurement grids 332 is occupied by a static obstacle or by a dynamic obstacle. In such instances, a conflict may arise, which, in an absence of additional sensor measurements and/or observations, may prove to be unresolvable.

Figure 4:
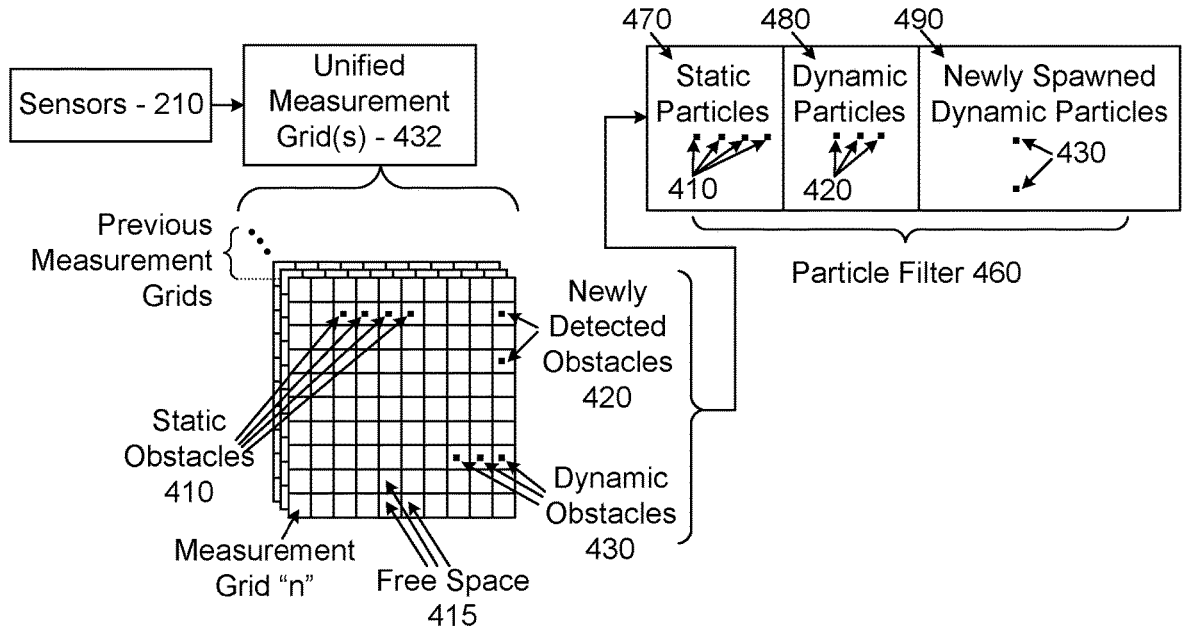
FIG. 4 depicts a schematic block diagram of an example system for sensor observation and/or measurement for detecting static and dynamic obstacles, according to an embodiment.

FIG. 4 depicts a schematic block diagram of an example system for sensor observation and/or measurement for detecting static and dynamic obstacles, according to an embodiment 400. It should be noted that the embodiment of FIG. 4 may improve upon the embodiment of FIG. 3 via, among other things, use of particle filter 460, which facilitates estimating weighted states corresponding to static and dynamic obstacles. Use of particle filter 460 in the embodiment of FIG. 4 may avoid instances of conflict between estimation of static obstacles and dynamic obstacles as noted with respect to FIG. 3.

In FIG. 4, output signals from sensors 210, which represent measurements and/or observations of a localized environment of vehicle 102, are positioned within unified measurement grids 432. As noted previously, unified measurement grids may represent an environment external to vehicle 102 corresponding to various time points (e.g., timestamps) of the vehicle environment as vehicle 102 proceeds along a path of travel. Accordingly, measurement grid "n" may represent a current vehicle environment, while previous measurement grids may represent a vehicle environment at previous points in time (e.g., timestamps). Particle filter 460 may utilize a Bayesian inference approach, in which past estimates of weighted states of particles may be utilized to compute estimates of weighted states corresponding to static and dynamic obstacles of more recent or current measurement grids. As shown in FIG. 4, estimated weighted states corresponding to static obstacles 410 may be allocated or assigned to a first portion of particle filter 460, such as static particle allocation 470. Also as shown in FIG. 4, estimated states corresponding to dynamic obstacles 420 may be allocated or assigned to a second portion of particle filter 460, such as dynamic particle allocation 480. Also shown in FIG. 4 are free space cells 415, which corresponds to areas of measurement grid "n" at which neither static nor dynamic obstacles have been detected. Further, newly detected particles 430, which may be initialized utilizing a random velocity, may be allocated or assigned to newly spawned particle allocation 490. Newly spawned particles 430 may be initialized with a weighted state of, for example, a nominal value of between 0.25, and 0.5; however, such initial weights may be arrived at empirically in accordance with a particular application. It should be noted that although FIG. 4 indicates only a handful of particles corresponding to static and dynamic obstacles are indicated as being processed by particle filter 460, in particular embodiments, particle filter 460 may represent estimated weighted states of a particular cell of measurement grid "n" utilizing, for example, hundreds of thousands of particles or, perhaps, millions of particles, and claimed subject matter is not limited in this respect. In one possible example, particle filter 460 is capable of tracking between 8 million and 50 million particles corresponding to static and dynamic obstacles located within measurement grid "n," and claimed subject matter is not limited in this respect.

Figure 5:
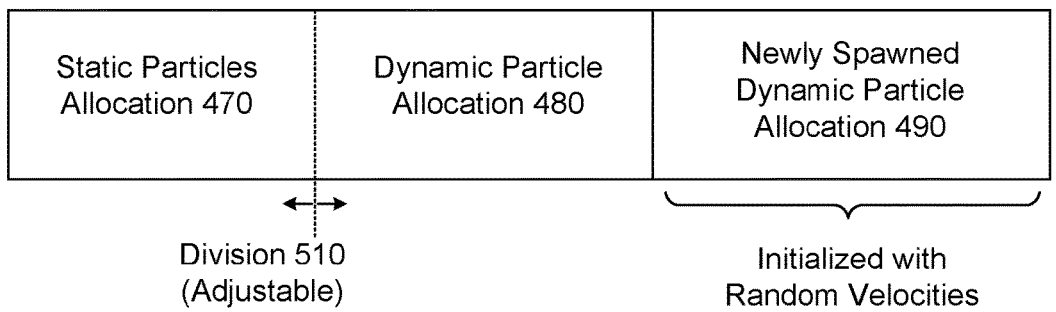
FIG. 5 depicts a schematic block diagram of an example particle filter for detecting static and dynamic obstacles, according to an embodiment.

FIG. 5 depicts a schematic block diagram of an example particle filter for detecting static and dynamic obstacles, according to an embodiment 500. In the embodiment of FIG. 5, particle filter 460 includes static particle allocation 470, which may operate to compute, monitor, and/or track estimates of weighted states corresponding to static obstacles represented in a unified measurement grid. Particle filter 460 also includes dynamic particle allocation 480, which may operate to compute, monitor, and/or track estimates of weighted states corresponding to dynamic obstacles represented in the unified measurement grid. Particle filter 460 also includes newly spawned dynamic particle allocation 490, which may operate to initialize and assign nominal weights to particles based on newly detected dynamic obstacles represented in the unified measurement grid.

Particle filter 460 also includes division 510, which operates as a movable boundary to separate static particle allocation 470 from dynamic particle allocation 480. In the embodiment of FIG. 5, division 510 represents a movable boundary, which may slide to the left or to the right depending on the ratio of particles corresponding to static obstacles, or the ratio of particles corresponding to dynamic obstacles, to a quantity of total particles tracked or monitored via particle filter 460. Thus, for example, based on detection of a number of stationary vehicles (e.g., parked vehicles) in a quiet city street, division 510 may be adjusted to the right, so as to accommodate a proportionally larger number of static obstacles with respect to a total number of obstacles. In another example, based on detection of a large number of moving vehicles, such as may be encountered in a freeway driving setting where stationary vehicles are absent, division 510 may be adjusted to the left, so as to accommodate a proportionally larger number of dynamic obstacles with respect to a total number of obstacles.

Based on newly detected dynamic obstacles in a unified measurement grid, estimates of weighted states corresponding to newly detected dynamic obstacles may be allocated within newly spawned dynamic particle allocation 490. For example, in a freeway driving setting, vehicles entering a freeway via an on-ramp may be positioned or assigned to one or more cells of a unified measurement grid. As previously mentioned, newly spawned particles, which may be initialized utilizing a random velocity and assigned an estimated weight of, for example, a value of between 0.25 and 0.5, although such initial weights may be determined empirically for particular applications.

As a vehicle (e.g., vehicle 102) progresses along a path of travel, newly spawned particles may be reallocated according to whether subsequent sampling of sensor measurements indicate that the estimated weighted state of a particle corresponds to a static obstacle or to a dynamic obstacle. In particular embodiments, based on successive resampling of sensor output signals, a particle may be reallocated from newly spawned dynamic particle allocation 490 to static particle allocation 470 and assigned a velocity vector of, for example, 0.0 or other negligible value. In such instances, static particles may be tracked utilizing vehicle egomotion exclusively, in which tracking and/or predicting future position of static obstacles is performed in accordance with a static reference frame. Based on successive resampling of sensor output signals that indicate presence of a dynamic obstacle, a particle may be reallocated from newly spawned dynamic particle allocation 490 to dynamic particle allocation 480. In such instances, dynamic particles may be tracked utilizing vehicle egomotion as well as a summation of past and present estimates of weighted states of the dynamic particles.

Figure 6:
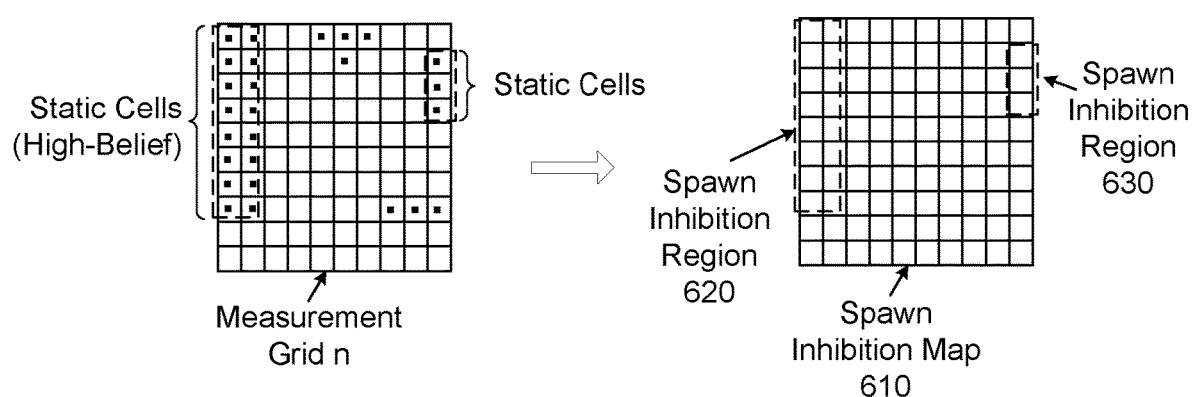
FIG. 6 depicts a schematic block diagram of unified measurement grids showing spawn inhibition regions, according to an embodiment.

FIG. 6 depicts a schematic block diagram of unified measurement grids showing spawn inhibition regions, according to an embodiment 600. In the embodiment of FIG. 6, which may occur after successive resampling of sensor observations and/or measurements as a vehicle (e.g., vehicle 102) progresses along a path of travel, particular regions of measurement grid "n" may be believed, such as in relation to a belief threshold, to be occupied exclusively by static cells. Such confidence or belief in the occupancy of particular cells of measurement grid "n" may arise based on a summation or accumulation of estimated weighted states of particles that correspond to the static cells depicted in FIG. 6. Accordingly, a particle filter may develop, form, or create spawn inhibition map 610, which operates to identify spawn inhibition regions, such as regions 620 and 630, of measurement grid "n." In particular embodiments, formation of spawn inhibition regions 620 and 630 may preclude particle filter 460, for example, from spawning dynamic particles within such regions. For example, based on vehicle 102 progressing along a path of travel through a narrow road lined exclusively with stationary vehicles, it may be unlikely to expect resampled sensor measurements and/or observations to indicate presence of a large number of dynamic obstacles. Hence, rather than assign newly spawned dynamic particles corresponding to cells of a unified measurement grid that are believed to contain static obstacles exclusively, particle filter 460 may inhibit formation of newly spawned dynamic particles within such cells. Accordingly, it may be appreciated that through the use of a spawn inhibition map, a particle filter may inhibit spawning of dynamic particles within spawn inhibition regions, thereby reducing processing demands of particle filter 460.

Figure 7:
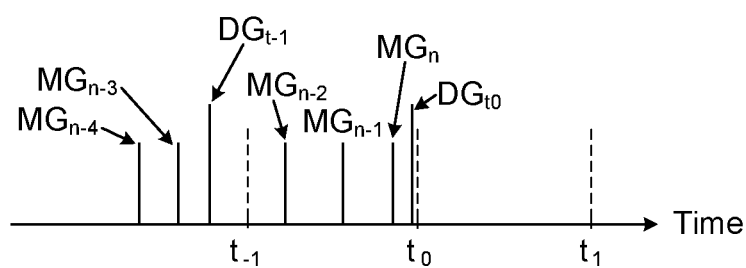
FIG. 7 depicts a representation of time-sequenced unified measurement grids and dynamic grids in an example system for sensor observation and/or measurement for detecting static and dynamic obstacles, according to an embodiment.

FIG. 7 depicts a representation of time-sequenced unified measurement grids and dynamic grids in an example system for sensor observation and/or measurement for detecting static and dynamic obstacles, according to an embodiment 700. In the embodiment of FIG. 7, the horizontal axis represents time, and the vertical axis represents formation of measurement grids (e.g., $MG_{n-4}$, $MG_{n-3}$, $MG_{n-2}$, $MG_{n-1}$) having particular timestamps along the horizontal axis. M Accordingly, measurement grids $MG_{n-4}$, $MG_{n-3}$, $MG_{n-2}$, $MG_{n-1}$, and $MG_n$ represent unified measurement grids corresponding to successive samples of sensor measurements and/or observations having timestamps occurring in the past as vehicle 102 has progressed along a path of travel. As depicted, $MG_{n-4}$, and $MG_{n-3}$, represent measurement grids formed prior to time $t_{-1}$. $MG_{n-2}$, $MG_{n-1}$, and $MG_n$ represent measurement grids formed between time $t_{-1}$ (e.g., timestamp $t_{-1}$) and time $t_0$ (e.g., timestamp $t_0$) Dynamic grid $DG_{t-1}$ represents a dynamic unified grid formed under the control of computing device 230. In the embodiment of FIG. 7, dynamic grid $DG_{t-1}$ may be formed via retrodiction utilizing occupancy beliefs of cells from $MG_{n-4}$, $MG_{n-3}$. For example, based on at least a threshold occupancy belief that a particular cell of unified measurement grid $MG_{n-4}$ and $MG_{n-3}$ corresponds to a dynamic object moving at a persistent velocity, particle filter 460 may form dynamic grid $DG_{t-1}$. A computing device, such as computing device 230 of FIG. 2, may utilize such an occupancy belief to form $DG_{t-1}$, which represents an expected or predicted state of the dynamic obstacle in a unified measurement grid having a timestamp that is after formation of measurement grid $MG_{n-4}$ and $MG_{n-3}$. Similarly, at least in particular embodiments, based on a threshold occupancy belief that a particular cell of unified measurement grids $MG_{n-2}$, $MG_{n-1}$, and $MG_n$ persistently corresponds to a static object, particle filter 460 may form $DG_{t0}$. A computing device (e.g., computing device 230 of FIG. 2) may utilize such an occupancy belief to form dynamic grid $DG_{t0}$, which represents an expected or predicted state of the static obstacle in a unified measurement grid having a timestamp that approaches time $t_0$. In particular embodiments, computing device 230 may utilize egomotion of vehicle 102 and a velocity vector of particular cells to facilitate formation of unified dynamic grids $DG_{t-1}$ and $DG_0$. Also in particular embodiments, computing device 230 may exclusively utilize egomotion of vehicle of 102 to facilitate formation of dynamic grids $DG_{t-1}$ and $DG_0$.

Figure 8:
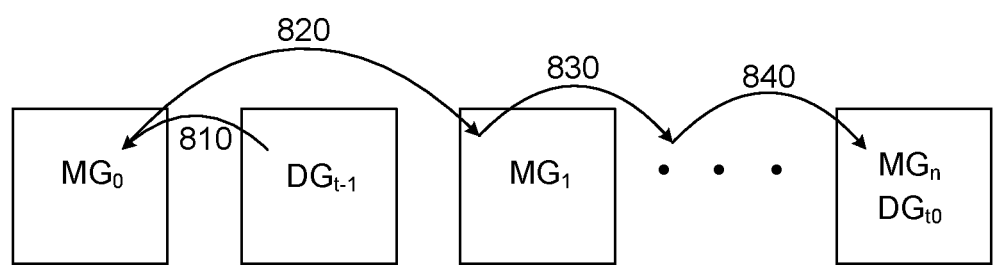
FIG. 8 depicts signal flow in a particle cloud of particle filter for detecting static and dynamic obstacles, according to an embodiment.

FIG. 8 depicts signal flow of particles of particle filter 460 for detecting static and dynamic obstacles, according to an embodiment 800. Thus, in the embodiment of FIG. 8, computing device, such as computing device 230 of FIG. 2, may form unified dynamic measurement grid $DG_{t-1}$ via access of unified measurement grid $MG_0$ to facilitate retrodiction of the states of static and/or dynamic obstacles occupied by cells of $MG_0$. Under the control of computing device 230 of FIG. 2, for example, unified dynamic grid $DG_{t-1}$ may be formed via retrodicting particles corresponding to static and dynamic obstacles from unified measurement grid $MG_0$ as indicated by signal flow 810. Following formation of dynamic grid $DG_{t-1}$, computing device 230 may operate to collect or gather sensor measurements and/or observations over additional unified measurement grids, such as $MG_0$ and $MG_1$ as indicated via signal flow 820. It should be noted that although only 2 unified measurement grids having timestamps prior to unified measurement grid $MG_n$ and unified dynamic grid $DG_{t0}$ are indicated in FIG. 8, in particular embodiments, sensor measurements and/or observations may be collected over a much larger number of unified measurement grids as indicated by signal flows 830 and 840 such as, for example, 20 unified measurement grids, 30 unified measurement grids, 40 unified measurement grids or, perhaps, hundreds of measurement grids, and claimed subject matter is not limited in this respect. In operations to collect sensor measurements and/or observations, computing device 230 may utilize measurement beliefs, which may correspond to a level of confidence that particles corresponding to cells of a unified measurement grid represent static or dynamic obstacles. Computing device 230 may utilize such parameters to update particle occupancy weights for cells of unified measurement grids in computing operations to give rise to final particle weights for dynamic particle allocations (e.g., dynamic particle allocation 480 of FIG. 4).

In particular embodiments, formation of unified dynamic grid $DG_{t0}$ and unified measurement grid $MG_n$, and the update of static particles within particle filter 460 may occur utilizing a static reference frame, in which vehicle egomotion is exclusively considered. Under the control of computing device 230, a measurement belief that a static obstacle occupies a cell of a unified measurement grid may be initialized. For example, such a measurement belief may be initiated utilizing static particle weights and a measurement belief that an underlying cell (e.g., a cell of a measurement grid having a previous timestamp) corresponds to free space. In particular embodiments, updates to static particle weights may represent an occupancy mass of a static cell. In some embodiments, a free space mass may be written to a separate array and may be identified based on updates (e.g., resampling of sensor observations and/or measurements) to cells having at least a predetermined threshold of free space belief. Within particle filter 460, a particle array may be sorted according to cell index. Persistent static particles and newly spawned static particles may be sorted utilizing separate memory arrays of particle filter 460. Particle filter 460 may compute an inclusive sum over all (or substantially all) particles to compute cell statistics, such as estimated weighted states and/or particle velocity.

In particular embodiments, particle filter 460 may compute static particle weights for individual cells. To determine or estimate that a cell of a unified measurement grid represents a dynamic obstacle, a ratio of dynamic particle weights versus static particle weights may be computed. Determination or estimation that a cell is occupied by a dynamic object may be based on a Mahalanobis distance between dynamic particles of particle filter 460 and a distribution of static particles. In such context, for example, based on particles having relatively small velocities, it may be hypothesized that such relatively small velocities represent static obstacles rather than dynamic obstacles. Under such circumstances, particle filter 460 may form an occupancy belief, which is greater than a predetermined threshold, that such cells correspond to static cells rather than dynamic cells. It should be noted that in other embodiments, a different measure, other than a Mahalanobis distance between dynamic particles of particle filter 460 and a distribution of static particles may be utilized to generate an occupancy belief that a cell of a measurement grid corresponds to a static cell, and claimed subject matter is not limited in this respect. In particular embodiments based on an occupancy belief that a non-negligible number of particles may be reallocated as static particles (rather than dynamic particles), division 510 (of FIG. 5) may be adjusted so as to facilitate a larger portion of particle filter 460 to track a greater number of static particles and a lesser number of dynamic particles.

In particular embodiments, after computing, for example, a Mahalanobis distance between dynamic particles of particle filter 460 and a distribution of static particles, all (or substantially all) cells may be retrodicted with occupancy to previous measurement grids and a previous dynamic grid (e.g., $DG_{t-1}$). Computing device 230 may then gather statistics with respect to a semantic top label of cells of unified measurement grids (e.g., a static obstacle, a dynamic obstacle, free space) as well as identifying a source of a sensor observation and/or measurement. In particular embodiments, more particular semantic labels may be assigned to one or more cells of a unified measurement grid, such as whether a dynamic obstacle corresponds to a vehicle, a pedestrian, a bicycle, a running animal, etc. Further, semantic labels may be assigned to static cells of a measurement grid, such as whether a static obstacle corresponds to a stationary vehicle, a building, a traffic abutment, etc. Cell semantic labels may be utilized to score and influence a resampling ratio of static particle versus dynamic particle masses of cells of a measurement grid. In some embodiments, at least some dynamic particles may be maintained in potentially dynamic cells. Thus, for cells having a mid-range occupancy belief that the cell represents a dynamic obstacle, but for which an occupancy belief is medium (e.g., 0.4-0.8) such cells may be maintained as dynamic cells.

In particular embodiments, after assigning cell semantic labels, persistent static particles and newly spawned static particles, which may be stored in separate memory arrays, may be integrated into a single obstacle measurement grid. A single obstacle measurement grid may include free space regions, visible space, and under- or non-drivable regions (e.g., regions between obstacles). After formation of a single obstacle measurement grid, particle weights may be normalized to represent a particle impact on a single obstacle measurement grid which may influence, at least in particular embodiments, whether certain particles are to be resampled. During resampling operations, all particles may be assigned the same or similar weight. In addition, cells having at least an occupancy belief that exceeds a predetermined threshold may be assigned a greater number of particles than cells having lower than a threshold occupancy belief.

Figure 9:
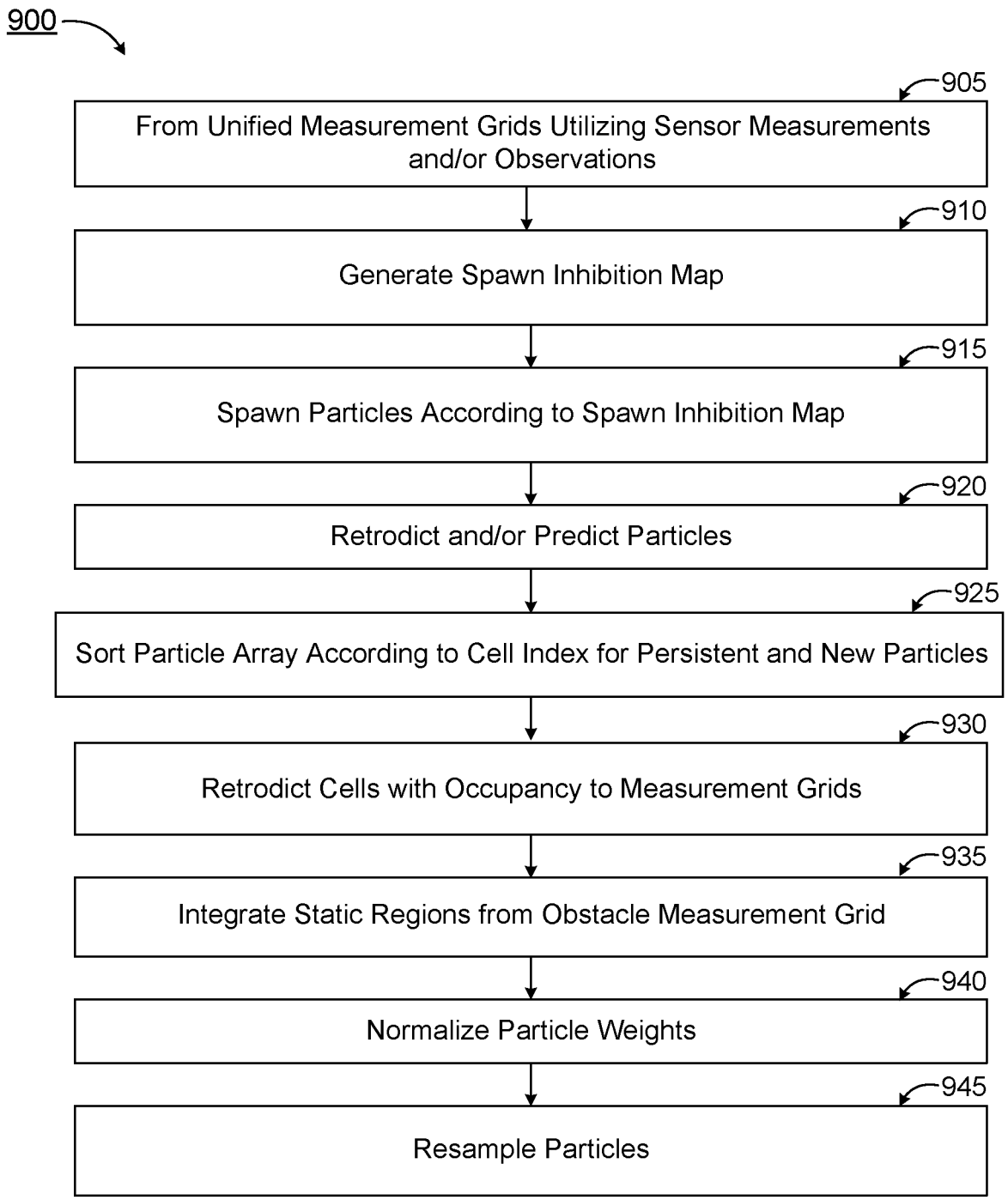
FIG. 9 is a first flowchart for a method for detecting static and dynamic obstacles, according to an embodiment.

FIG. 9 is a first flowchart for a method for detecting static and dynamic obstacles, according to an embodiment 900. The operations of FIG. 9 (and the operations of FIG. 10) may summarize or recapitulate many of the operations described in reference to figures previously described herein, such as FIGS. 4-8. It should be noted that embodiments in accordance with claimed subject matter may include all of the actions depicted at operations 905-945 (and operations 1005-1020 of FIG. 10), fewer actions than those depicted at operations 905-945 (and operations 1005-1020 of FIG. 10) and/or more actions than those depicted at operations 905-945 (and operations 1005-1020 of FIG. 10). Likewise, it should be noted that measurements and/or observations acquired or produced, such as, for example, input signals, output signals, operations, results, etc., brought about by the example process of embodiments 900 and 1000 may be represented via one or more digital signals. It should also be appreciated that even though one or more operations are illustrated or described concurrently or with respect to a certain sequence, other sequences or concurrent operations may be performed. In addition, although the description below references particular aspects and/or features illustrated in certain other figures, one or more operations may be performed with other aspects and/or features. In embodiments, operations 905-945 and 1005-1020 may be communicated as one or more signals and/or signal packets among various software, firmware and/or hardware services executed at a computing device, such as computing device 230 of vehicle 102, for example.

The method of FIG. 9 may begin at operation 905, which may include forming, such as in reference to FIG. 7, one or more unified measurement grids (e.g., $MG_{n-4}$, $MG_{n-3}$, etc.) utilizing sensor measurements and/or observations. Operation 905 may additionally include computing appropriate metadata for measurement grids, such as to compensate for egomotion of vehicle 102, time differences between formation of unified measurement grids, and accumulated occupancy beliefs of various cells within measurement grids. Operation 905 may additionally include removal of measurement grids having older timestamps, so as to reduce computing complexity and memory consumption of a computing device, such as computing device 230.

The method of FIG. 9 may continue at operation 910, which may include generating a spawn inhibition map. In accordance with FIG. 6, a spawn inhibition map may include spawn inhibition regions within which a particle filter may be precluded from spawning dynamic particles. Spawn inhibition regions may correspond to regions within a unified measurement grid at which there is at least a threshold belief, with respect to a predetermined threshold, that a static obstacle occupies one or more cells of the regions. Operation 910 may additionally include reducing spawned velocity and velocity standard deviation for particles newly spawned within cells having a high occupancy belief (or at least a threshold occupancy belief) of containing static obstacles. Operation 910 may further include retrodicting cells from a recent unified measurement grid to all (or substantially all) measurement grids to compute a spawn mass (e.g., quantity of spawned particles) for cells of a unified measurement grid based on sensor measurements and/or observations. Computing a spawn mass may be additionally based on particles determined to be persistent via retrodiction of previous unified measurement grids.

The method may continue at operation 915, which may include spawning particles in accordance with the spawn inhibition map formed at operation 910. In particular embodiments, spawning may be performed in parallel for all (or substantially all) new static particles and dynamic particles. In particular instances, the same or similar quantity of particles are spawned into each cells with particle weights that accord with the overall spawn mass of a given cell. In particular embodiments, for particles identified as being spawned within cells of previous measurement grids containing static objects, velocity magnitude and standard deviation may be reduced (or even assigned a value of 0.0 velocity).

The method may continue at operation 920, which may include retrodicting and/or predicting all (or substantially all) particles to all (or substantially all) measurement grids having timestamps corresponding to previous unified measurement grids as described in greater detail with respect to FIG. 8. Operation 920 may additionally include gathering and/or collecting sensor measurements and/or observations spread among one or more measurement grids.

Such measurements and/or observations may give rise to computing of measurement belief or confidence in a velocity match among measurement grids. Operation 920 may additionally include utilizing a measurement belief to update an occupancy belief and to determine an optimized velocity match for dynamic obstacles within cells of a unified measurement grid. With respect to static particles, computing device 230 may remove (or at least substantially reduce) the magnitude of velocity components. With respect to static particles, static particles may be updated in a unified measurement grid by considering egomotion exclusively and shifting a measurement grid in accordance with a static reference frame. Static particles may also be initialized with a static particle weight (e.g., 0.25, 0.3, 0.4, etc.). Updated static particle weights may represent an occupancy mass of an updated cell. Free space mass (e.g., cells of a unified measurement grid corresponding to free space regions) may be written to a separate array and identified accordingly.

The method may continue at operation 925, which may include sorting a particle array in accordance with cell indices for persistent and newly spawned particles utilizing separate memory arrays. Operation 925 may additionally include computing an inclusive sum over all particles (or substantially all particles) computed for various particle statistics, such as particle weights and velocities. Computing device 230 may compute cell statistics based on an impact of newly spawned particles versus persistent particles computed, for example, utilizing unified measurement grids having prior timestamps. It should be noted that a static particle weight can be computed for individual cells of a measurement grid. Cells of a measurement grid may be determined or estimated to contain a dynamic obstacle based on a ratio of dynamic particle weights versus static particle weights. As described in reference to FIG. 8, determination or estimation that a cell is occupied by a dynamic object may be based on a Mahalanobis distance between dynamic particles of particle filter 460 and a distribution of static particles.

The method may continue at operation 930, which may include retrodicting all cells (or substantially all cells) having an occupancy belief greater than a predetermined threshold value to a recent unified dynamic grid, such as $DG_{r0}$ described in reference to FIG. 8. Computing device 230 may gather or collect statistics regarding a semantic label, and a sensor source. Such statistics may permit classification of dynamic obstacle, such as another vehicle, a pedestrian, a bicycle, etc. Statistics may also permit classification of a static obstacle, such as a stationary vehicle, a building, a wall, a traffic abutment, etc. Semantic labels may be utilized to score and influence a resampling ratio of static particle masses and dynamic particle masses of cells in a unified measurement grid. In some embodiments, at least some dynamic particles may be maintained in potentially dynamic cells. Thus, for cells having an occupancy belief that the cell represents a dynamic obstacle, but for which the occupancy belief is medium (e.g., 0.4-0.8 or other predetermined threshold) such cells may be maintained as dynamic cells.

The method may continue at operation 935, which may include integrating static cells of a unified obstacle measurement grid. Such integration may include updating cells having an occupancy belief (at least above a predetermined threshold value) to indicate free or visible space, as well as measurement cells indicating free space in between cells corresponding to static or dynamic obstacles (e.g., underdrivable cells). The method may continue at operation 940, which may include normalization of particle weights to represent particle impacts on a newly created unified measurement grid which, in particular embodiments, may impact a likelihood of certain particles to be resampled, such as at operation 945. Resampled particles may be assigned the same or similar weight. Further, cells having a relatively high occupancy belief (e.g., greater than a predetermined threshold value) may be expected to include a larger quantity of particles than cells having a relatively lower occupancy belief (e.g., less than a predetermined threshold value). In particular embodiments, cells of a unified measurement grid having a relatively low occupancy belief (e.g., less than 0.25, 0.3, 0.4, or 0.45, etc.) may be resampled as static or dynamic particles. Responsive to resampling of static particles and dynamic particles, a unified measurement grid may be classified as containing a static obstacle or a dynamic obstacle.

Figure 10:
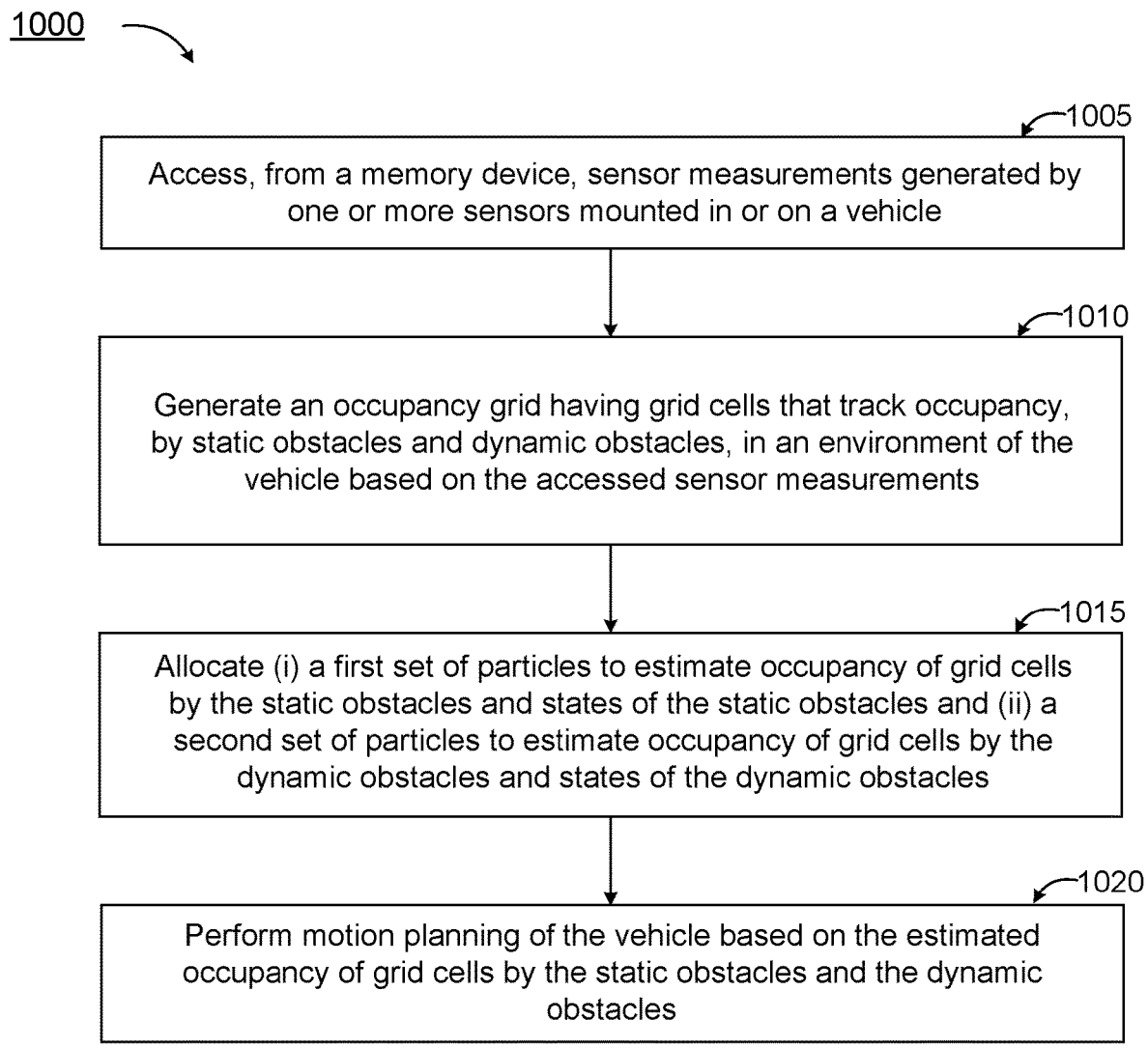
FIG. 10 is a second flowchart for a method for detecting static and dynamic obstacles, according to an embodiment.

FIG. 10 is a first flowchart for a method for detecting static and dynamic obstacles, according to an embodiment 1000. The method of FIG. 10 may begin at operation 1005, which may include accessing, from a memory device, sensor measurements and/or observations generated by sensors mounted in or on a vehicle, such as sensors 210 of FIG. 2. The method may continue at operation 1010, which may include generating an occupancy grid having grid cells that track occupancy by static obstacles and dynamic obstacles, in an environment based on the sensor measurements and/or observations accessed at operation 1005. The method may continue at operation 1015, which may include allocating, such as to appropriate locations within particle filter 460, a first set of particles to estimate occupancy of grid cells by the static obstacles and states of the static obstacles. Operation 1015 may additionally include allocating such as to appropriate locations within particle filter 460, a second set of particles to estimate occupancy of grid cells by the dynamic obstacles and states of the dynamic obstacles. The method may continue at operation 1020, which may include performing motion planning of the vehicle based on the estimated occupancy of grid cells by the static obstacles and the dynamic obstacles. Motion planning of the vehicle may be performed by an autonomous driving application, such as autonomous driving application 240 described with respect to FIG. 2.

Figure 11:
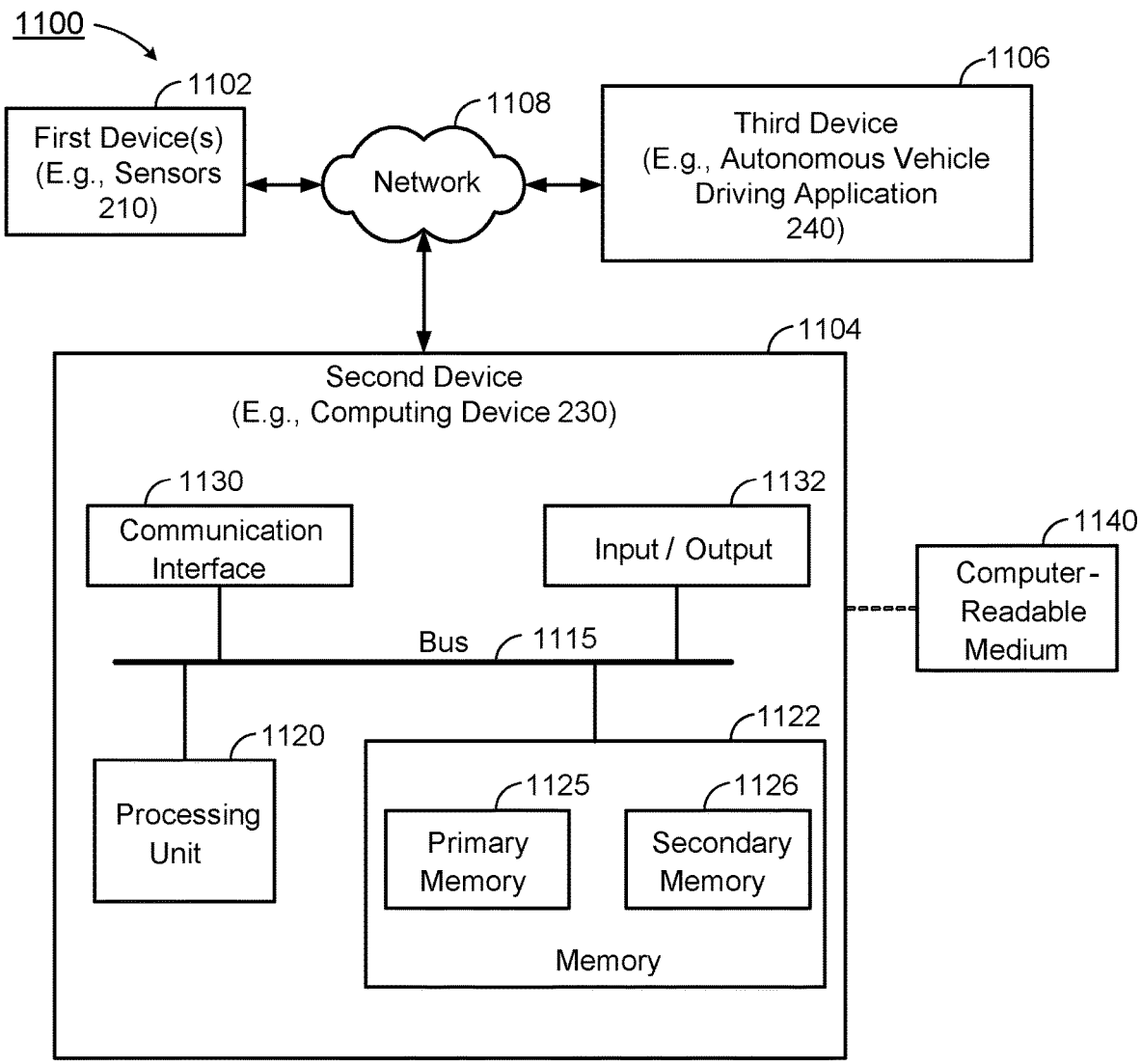
FIG. 11 is a diagram showing a computing environment, according to an embodiment.

FIG. 11 is a diagram showing a computing environment, according to an embodiment 1100. In the embodiment of FIG. 11, first device(s) 1102, which may correspond to one or more sensors mounted in or on a vehicle, such as vehicle 102, may transmit sensor measurements and/or observations via vehicle communications network 1108 to second device 1104. Second device 1104 may potentially include a computing device, such as computing device 230 of FIG. 2, which may implement a particle filter (e.g., particle filter 460 of FIG. 4). Second device 1104 may communicate with third device 1106, which may operate as an autonomous vehicle driving application (e.g., autonomous vehicle driving application 240 of FIG. 2). In FIG. 11, first device(s) 1102 may also include features of at least one computer processor coupled to at least one memory device and/or a server computing device. Processor (e.g., having one or more computer processors) 1120 and memory 1122, which may include primary memory 1125 and secondary memory 1126, may communicate by way of a communication interface 1130, for example. The term "computing device," or "computing resource" in the present patent application, refers to a system and/or a device, such as a computing apparatus that includes a capability to process (e.g., perform computations) sufficient to implement a particle filter or other type of optimization filter as described herein. Thus, a computing device, in the setting or environment of the present patent application, may include hardware, software, firmware, or any combination thereof (other than software per se). Second device 1104, as depicted in FIG. 11, is merely one example, and claimed subject matter is not limited in scope to this particular example.

In FIG. 11, first device(s) 1102 may include one or more sources of executable computer instructions in the form of physical states and/or signals (e.g., stored in memory states), for example. As previously mentioned, a connection, while physical, may be virtual while not necessarily being tangible. Although second device 1104 shows various tangible, physical components, claimed subject matter is not limited to a computing devices having only these tangible components as other embodiments may include alternative arrangements that may include additional tangible components or fewer tangible components, for example, that function differently while achieving similar results. Rather, examples are provided merely as illustrations. It is not intended that claimed subject matter be limited in scope to illustrative examples.

Memory 1122 may include any non-transitory storage mechanism. Memory 1122 may include, for example, primary memory 1125 and secondary memory 1126, additional memory circuits, mechanisms, or combinations thereof may be used. Memory 1122 may include, for example, random access memory, read only memory, etc., such as in the form of one or more storage devices and/or systems, such as, for example, a disk drive including an optical disc drive, a tape drive, a solid-state memory drive, etc., just to name a few examples.

Memory 1122 may include one or more articles utilized to store a program of executable computer instructions. For example, processor 1120 (which may include one or more computer processors) may fetch executable instructions from memory and proceed to execute the fetched instructions. Memory 1122 may also include a memory controller for accessing device readable-medium 1140 that may carry and/or make accessible digital content, which may include code, and/or instructions, for example, executable by processor 1120 and/or some other device, such as a controller, as one example, capable of executing computer instructions. Under direction of processor 1120 (e.g., one or more computer processors), a non-transitory memory, such as memory cells storing physical states (e.g., memory states), including, for example, a program of executable computer instructions, may be executed by processor 1120 and able to generate signals to be communicated via a network, for example, as previously described. Generated signals may also be stored in memory, also as previously suggested.

Memory 1122 may store electronic files and may also include a machine-readable medium that may carry and/or make accessible content, including code and/or instructions, for example, executable by processor 1120 and/or some other device, such as an autonomous vehicle driving controller, as one example, capable of executing computer instructions. As previously mentioned, the term electronic file is used throughout this document to refer to a set of stored memory states and/or a set of physical signals associated in a manner so as to thereby form an electronic file. That is, it is not meant to implicitly reference a particular syntax, format and/or approach used, for example, with respect to a set of associated memory states and/or a set of associated physical signals. It is further noted that an association of memory states, for example, may be in a logical sense and not necessarily in a tangible, physical sense. Thus, although signal and/or state components of an electronic file are to be associated logically, storage thereof, for example, an electronic file may reside in one or more different places in a tangible, physical memory.

Algorithmic descriptions and/or symbolic representations are examples of techniques used by those of ordinary skill in the signal processing and/or related arts to convey the substance of their work to others skilled in the art. An algorithm is, in the setting or environment of the present patent application, and generally, is considered to be a self-consistent sequence of operations and/or similar signal processing leading to a desired result. In the setting or environment of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

Processor 1120 may include one or more circuits, such as digital circuits, to perform at least a portion of a computing procedure and/or process. By way of example, but not limitation, processor 1120 may include one or more processors, such as controllers, micro-processors, micro-controllers, application specific integrated circuits, digital signal processors, programmable logic devices, field programmable gate arrays, or any combination thereof. In various embodiments, processor 1120 may perform signal processing, typically substantially in accordance with fetched executable computer instructions, such as to manipulate signals and/or states, to construct signals and/or states, etc., with signals and/or states generated in such a manner to be communicated and/or stored in memory.

FIG. 11 also illustrates second device 1104 as including a component 1132 operable with input/output devices, and communication bus 1115, for example, so that signals and/or states may be appropriately communicated between devices, such as second device 1104 and an input device and an output device. A user may make use of an input device, such as a computer mouse, stylus, track ball, keyboard, in-vehicle infotainment console, and/or any other similar device capable of receiving user actions and/or motions as input signals. Likewise, for a device having speech-to-text capability, a user may speak to generate input signals. Likewise, a user may make use of an output device, such as a display and/or any other device capable of providing signals and/or generating stimuli for a user, such as visual stimuli, audio stimuli, haptic stimuli, and/or other similar stimuli.

Unless otherwise indicated, in the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. An apparatus, comprising:
   a processor coupled to at least one memory device, the processor configured to:
   access, from the at least one memory device, sensor measurements generated by one or more sensors mounted in a vehicle;
   generate an occupancy grid having grid cells that track occupancy, by static obstacles and dynamic obstacles, in an environment of the vehicle based on the accessed sensor measurements;
   adjust an allocation of a first set of particles and a second set of particles based on the accessed sensor measurements to modify operation of a particle filter, which adjusts a movable division that is to separate the first set of particles from the second set of particles based on a ratio of a quantity of the first set of particles to a total quantity of particles, or a ratio of a quantity of the second set of particles, to the total quantity of particles;
   allocate (i) the first set of particles to estimate occupancy of grid cells by the static obstacles and states of the static obstacles and (ii) the second set of particles to estimate occupancy of grid cells by the dynamic obstacles and states of the dynamic obstacles; and
   execute one or more operations to plan motion of the vehicle based on the estimated occupancy of grid cells by the static obstacles and dynamic obstacles.

2. The apparatus of claim 1, wherein the processor is further configured to:
   allocate a third set of particles as newly spawned particles based on the accessed sensor measurements.

3. The apparatus of claim 1, wherein the processor is further configured to:
   reduce a magnitude of one or more velocity vectors of the first set of particles in relation to a magnitude of one or more velocity vectors of the second set of particles.

4. The apparatus of claim 3, wherein the processor is further configured to:
predict a future position of at least one of the static obstacles relative to a static reference frame.

5. The apparatus of claim 1, wherein the processor is further configured to:
resample one or more of the second set of allocated particles to update the estimated states of the dynamic obstacles; and
classify a cell of the occupancy grid as a dynamic cell based on of the second set of allocated particles.

6. The apparatus of claim 5, wherein the processor is further configured to:
classify the cell of the occupancy grid as the dynamic cell further based on a confidence factor exceeding a threshold value.

7. A method of processing measurements to estimate states of one or more objects, the method being performed by one or more processors and comprising:
accessing, from a memory device, sensor measurements generated by one or more sensors mounted in a vehicle;
generating an occupancy grid having grid cells that track occupancy, by static obstacles and dynamic obstacles, in an environment of the vehicle based on the accessed sensor measurements;
adjusting an allocation of a first set of particles and a second set of particles based on the accessed sensor measurements to modify operation of a particle filter, which adjusts a movable division that is to separate the first set of particles from the second set of particles based on a ratio of a quantity of the first set of particles to a total quantity of particles, or a ratio of a quantity of the second set of particles, to the total quantity of particles;
allocating (i) the first set of particles to estimate occupancy of grid cells by the static obstacles and states of the static obstacles and (ii) the second set of particles to estimate occupancy of grid cells by the dynamic obstacles and states of the dynamic obstacles; and
performing motion planning of the vehicle based on the estimated occupancy of grid cells by the static obstacles and dynamic obstacles.

8. The method of claim 7, further comprising:
allocating a third set of particles as newly spawned particles based on the accessed sensor measurements.

9. The method of claim 7, further comprising:
reducing a magnitude of one or more velocity vectors of the first set of particles in relation to a magnitude of one or more velocity vectors of the second set of particles.

10. The method of claim 9, further comprising:
predicting a future position of at least one of the static obstacles relative to a static reference frame.

11. The method of claim 7, further comprising:
resampling one or more of the second set of allocated particles to update the estimated states of the dynamic obstacles; and
classifying a cell of the occupancy grid as a dynamic cell based on the resampled one or more of the second set of allocated particles.

12. The method of claim 11, further comprising:
determining a confidence factor that the dynamic cell exceeds a threshold prior to classifying the cell of the occupancy grid as the dynamic cell.

13. An article, comprising:
a non-transitory storage media having instructions encoded thereon, which, when executed by a computer processor coupled to at least one memory device, cause the computer processor to:
access, from the memory device, sensor measurements generated by one or more sensors mounted in a vehicle;
generate an occupancy grid having grid cells that track occupancy, by static obstacles and dynamic obstacles, in an environment of the vehicle based on the accessed sensor measurements;
adjust an allocation of a first set of particles and a second set of particles based on the accessed sensor measurements to modify operation of a particle filter, which adjusts a movable division that is to separate the first set of particles from the second set of particles based on a ratio of a quantity of the first set of particles to a total quantity of particles, or a ratio of a quantity of the second set of particles, to the total quantity of particles;
allocate (i) the first set of particles to estimate occupancy of grid cells by the static obstacles and states of the static obstacles and (ii) the second set of particles to estimate occupancy of grid cells by the dynamic obstacles and states of the dynamic obstacles; and
execute one or more operations to plan motion of the vehicle based on the estimated occupancy of grid cells by the static obstacles and dynamic obstacles.

14. The article of claim 13, wherein the encoded instructions are further to cause the computer processor to:
resample one or more of the second set of allocated particles to update the estimated states of the dynamic obstacles; and
classify a cell of the occupancy grid as a dynamic cell based on the resampled one or more of the second set of allocated particles.

* * * * *